US012422728B2

(12) United States Patent
Dawson

(10) Patent No.: US 12,422,728 B2
(45) Date of Patent: Sep. 23, 2025

(54) ACOUSTO-OPTIC DEVICE AND METHOD

(71) Applicant: MBDA UK LIMITED, Stevenage (GB)

(72) Inventor: Christopher Joseph Dawson, Stevenage (GB)

(73) Assignee: MBDA UK LIMITED, Stevenage (GB)

(*) Notice: Subject to any disclaimer, the term of this patent is extended or adjusted under 35 U.S.C. 154(b) by 418 days.

(21) Appl. No.: 17/766,790

(22) PCT Filed: Oct. 5, 2020

(86) PCT No.: PCT/GB2020/052452
§ 371 (c)(1),
(2) Date: Apr. 6, 2022

(87) PCT Pub. No.: WO2021/069873
PCT Pub. Date: Apr. 15, 2021

(65) Prior Publication Data
US 2024/0069406 A1   Feb. 29, 2024

(30) Foreign Application Priority Data

Oct. 9, 2019  (GB) ...................................... 1914593
Oct. 16, 2019 (EP) ...................................... 19275093

(51) Int. Cl.
*G02F 1/33* (2006.01)
*G02F 1/11* (2006.01)
*G01S 17/88* (2006.01)

(52) U.S. Cl.
CPC ................ *G02F 1/33* (2013.01); *G02F 1/113* (2013.01); *G01S 17/88* (2013.01)

(58) Field of Classification Search
CPC ............. G02F 1/33; G02F 1/113; G02F 1/332
See application file for complete search history.

(56) References Cited

U.S. PATENT DOCUMENTS 3,633,995 A   1/1972  Lean et al.
4,343,536 A   8/1982  Watanabe et al.
(Continued)

FOREIGN PATENT DOCUMENTS

DE    4109256 A1   9/1992
EP    0867744 B1   12/2008
WO    2005121889 A2   12/2005

OTHER PUBLICATIONS

International Search Report and Written Opinion dated Dec. 10, 2020 issued in PCT/GB2020/052452.
(Continued)

*Primary Examiner* — Joseph P Martinez
(74) *Attorney, Agent, or Firm* — Scully, Scott, Murphy & Presser, P.C.

(57) ABSTRACT

An acousto-optic device is disclosed. The device comprises: an optically transmissive element to receive a beam of light at an input surface, the beam being received from a direction defining an optical axis; a set of acoustic transducers spaced around the element; and a controller operable to activate the transducers to generate an acoustic wave travelling through the device to intersect with the optical axis. The controller is further operable to selectively activate a first subset of the set of transducers such that the acoustic wave propagates in a selected direction. Each of the set of acoustic transducers is differently orientated such that the selected direction is controllable through the selection of first subset of transducers from the set of transducers, and the device is thereby operable to control the direction in which the beam of light is deflected in two dimensions. A method of operating the device is also disclosed.

19 Claims, 4 Drawing Sheets

(56) References Cited

U.S. PATENT DOCUMENTS

| | | | |
|---|---|---|---|
| 5,088,659 A | | 2/1992 | Neff et al. |
| 5,963,569 A | * | 10/1999 | Baumgart ............... G02F 1/113 |
| | | | 359/312 |
| 8,300,303 B1 | | 10/2012 | Ruffa |
| 2002/0102064 A1 | | 8/2002 | Rosemeier et al. |
| 2002/0141035 A1 | | 10/2002 | Davidson et al. |
| 2015/0338718 A1 | | 11/2015 | Zhang et al. |

OTHER PUBLICATIONS

Extended EP Search Report dated Mar. 27, 2020 issued in EP 19275093.3.
GB Search Report dated Apr. 9, 2020 issued in GB 1914593.7.
International Preliminary Report on Patentability and Written Opinion dated Apr. 21, 2022 issued in PCT/GB2020/052452.

* cited by examiner

ACOUSTO-OPTIC DEVICE AND METHOD

FIELD OF THE INVENTION

This invention relates to an acousto-optic device, and to a method of operating such a device. More particularly the invention relates to an acousto-optic device that is operable to deflect an input optical beam in a controllable direction.

BACKGROUND

Acousto-optic devices use acoustic waves passing through an optical medium to modulate or deflect light passing through the medium. Acoustic waves result in a series of alternating regions of compression and rarefaction in the optical medium, which in turn modulate the refractive index of the medium. This modulation of the refractive index creates an effect similar to a diffraction grating, the properties of which can be varied through control of the frequency and power of the acoustic wave.

SUMMARY OF THE INVENTION

An acousto-optic device operable to deflect a beam of light, the device comprising: an optically transmissive element to receive the beam of light at an input surface, the beam being received from a direction defining an optical axis; a set of acoustic transducers spaced around the element; and a controller operable to activate the transducers to generate an acoustic wave travelling through the device to intersect with the optical axis; the controller being further operable to selectively activate a first subset of the set of transducers such that the acoustic wave propagates in a selected direction; and wherein each of the set of acoustic transducers is differently orientated such that the selected direction is controllable through the selection of first subset of transducers from the set of transducers, the device thereby being operable to control the direction in which the beam of light is deflected in two dimensions. Whilst typical acousto-optic devices can alter the direction of deflection in one dimension by varying the frequency of the acoustic wave interacting with the beam of light, essentially changing the magnitude of the deflection, the present acousto-optic device can provide greater flexibility by enabling control the direction of deflection in two dimensions by altering which of a set of transducers are activated.

The controller may be operable to control the frequency, relative phase, and amplitude at which the first subset of acoustic transducers are activated such that the generated acoustic wave exhibits a generally planar wavefront where it intersects with the optical axis. The wavefront may be generally planar in the plane perpendicular to the optical axis. Suitable control of the relative phase and amplitude of the activation is expected to enable control of the direction of deflection to within a few degrees in example embodiments described below. The first subset of the set of transducers may comprise a plurality of the set of transducers. For example, the first subset may comprise approximately half of the set of transducers. The first subset of the set of transducers may be positioned adjacent one another on the element.

The transducers may be arranged on the optically transmissive element such that individual activation of one of the transducers generates an approximately cylindrical wavefront in the element.

The device may comprise a plurality of sets of acoustic transducers spaced around the element, each of the plurality of sets of acoustic transducers being spaced apart along the optical axis of the element. The controller may be operable to activate the plurality of sets of transducers such that the angle at which the beam intersects the acoustic wavefront remains approximately constant as the beam propagates through the element. In this case the acoustic wavefront is curved in the plane containing the optical axis. The angle at which the optical beam intersects the acoustic wavefront may be at or near the Bragg angle. At the Bragg angle the efficiency of transfer of optical power to the deflected beam is enhanced.

The optically transmissive element may have a surface that is at least partly curved. The set of transducers may be provided on the curved surface such that they are differently oriented as described above. In some exemplary embodiments described further below the optically transmissive element is generally cylindrical. The or each set of acoustic transducers may be distributed around a loop on the optically transmissive element. The range of possible deflection directions is greater when the transducers are positioned in such a manner.

The beam may be received substantially normally to the input surface of the optical element. In contrast to typical acousto-optic devices the device is then rotationally symmetrical about the optical axis defined by the direction from which the beam is received.

The controller may be further operable to activate a second subset of the set of transducers, at a delay after the first subset of the set of transducers is activated, the delay, amplitude, and relative phase at which the second subset of the transducers is activated being selected so as to generally cancel the acoustic wave after it has intersected with the optical axis. This mitigates potential problems caused by reflection of the acoustic wave within the element, without necessitating the use of an acoustic absorber. The second subset of the set of transducers may comprise a plurality of the set of transducers. For example, the second subset may comprise approximately half of the set of transducers. The second subset of the set of transducers may be positioned adjacent one another on the element.

The element may be formed of a glass, or alternatively may be formed of a crystal. Suitable materials include but are not limited to those in the following list: tellurium dioxide; silica, doped silica, quartz, germanium, lithium niobate, lead molybdate (wulfenite), $Ge_{55}As_{12}S_{33}$, mercury (I) chloride and lead(II) bromide.

The set of acoustic transducers may comprise at least 5 acoustic transducers, preferably at least 10 acoustic transducers. In an embodiment described below 32 transducers are used. The set of acoustic transducers may comprise less than 100 acoustic transducers.

The invention extends to a LADAR system comprising a device as claimed in any one of the preceding claims. The invention further extends to a guided missile comprising such a LADAR system. Such an application is expected to benefit from the reduced size and weight that the present acousto-optic device can provide.

BRIEF DESCRIPTION OF THE DRAWINGS

Embodiments of the invention will now be described by way of example only and with reference to the accompanying drawings, of which.

DETAILED DESCRIPTION

Figure 1:
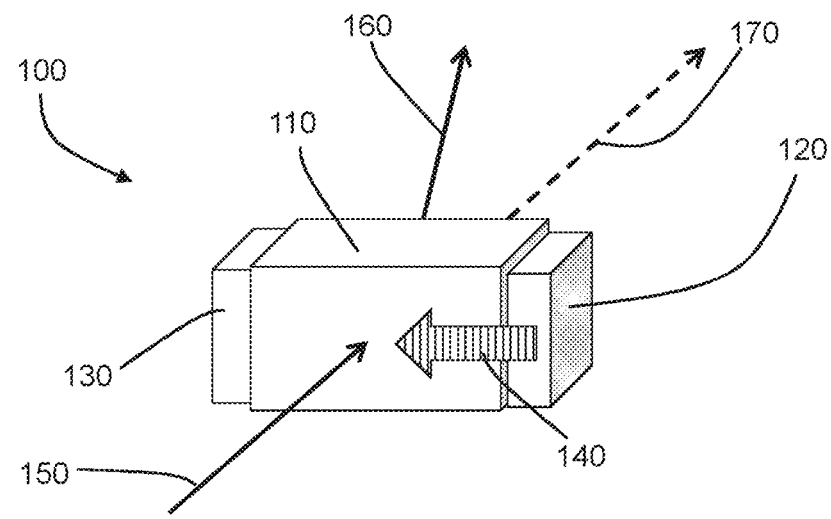
FIG. 1 is a schematic diagram showing a typical acousto-optic device.

A typical acousto-optic device 100 is illustrated in FIG. 1. Acousto-optic device 100 comprises an optically transmissive element 110 in the form of a rectangular cuboid of optical material. The optical material may be a glass or a crystalline material. The particular material selected for the optical material will depend upon the wavelength of the light with which it is to be used. For example, for near-infra-red wavelengths, the optical material may be tellurium dioxide. Silica, suitably doped if necessary, may be used for devices operated with ultraviolet, near-infrared, or longwave infra-red wavelengths. Quartz may be used for ultraviolet wavelengths; germanium at long wave infrared wavelengths; and lithium niobate at near infra-red wavelengths. Lead molybdate (wulfenite) may be used for visible for near infra-red wavelengths. Other materials such as $Ge_{55}As_{12}S_{33}$, mercury (I) chloride or lead(II) bromide may also be appropriate.

On one face of the element 110 is provided a piezo-electric transducer 120. On the opposing face is provided a layer of absorber material. The transducer 120 can be operated to generate an acoustic wave in the element 110, which travels in the direction from the one face to the opposing face, as indicated by arrow 140. This acoustic wave creates a series of compressions and rarefactions in the element in planes parallel to the first and second faces. An input beam 150 is incident on one of the remaining faces of the element (the input face). Part of the optical power of the input beam is transferred into a new, deflected beam 160 due to constructive interference of contributions from the diffraction of the input beam that occurs across a region in the optical material where the input beam and the acoustic wave interact. The deflected beam 160 and an undeflected beam 170 are emitted from the optical element 110 at an output face opposing the input face.

The deflection is in the direction of propagation of the acoustic wave in the material. The proportion of energy in the deflected beam 170 is greatest when the input beam 150 is incident on a plane acoustic wave travelling in the optical material at the Bragg angle $\theta_B$ to the acoustic wavefront. The Bragg angle is given by:

$$\theta_B = \lambda/2\Lambda$$

where $\lambda$ is the wavelength of the light in the optical material, and $\Lambda$ is the wavelength of sound in the optical material. The size of the angle through which the beam is deflected can therefore be altered by varying the frequency of the acoustic wave generated by the transducers. However it is not immediately possible to change the direction of the deflection of the optical beam using the device 100 of FIG. 1, which is determined by the direction of propagation of the acoustic wave—as illustrated in FIG. 1, if the acoustic wave propagates towards the left, the deflection will be towards the left. It is possible to arrange two such devices in series, the second being rotated with respect to the first so that an incident optical beam is deflected in a first direction by one of the devices, and then in a second direction by the other. In such a way it is possible for an optical beam to be scanned in two dimensions.

Figure 2:
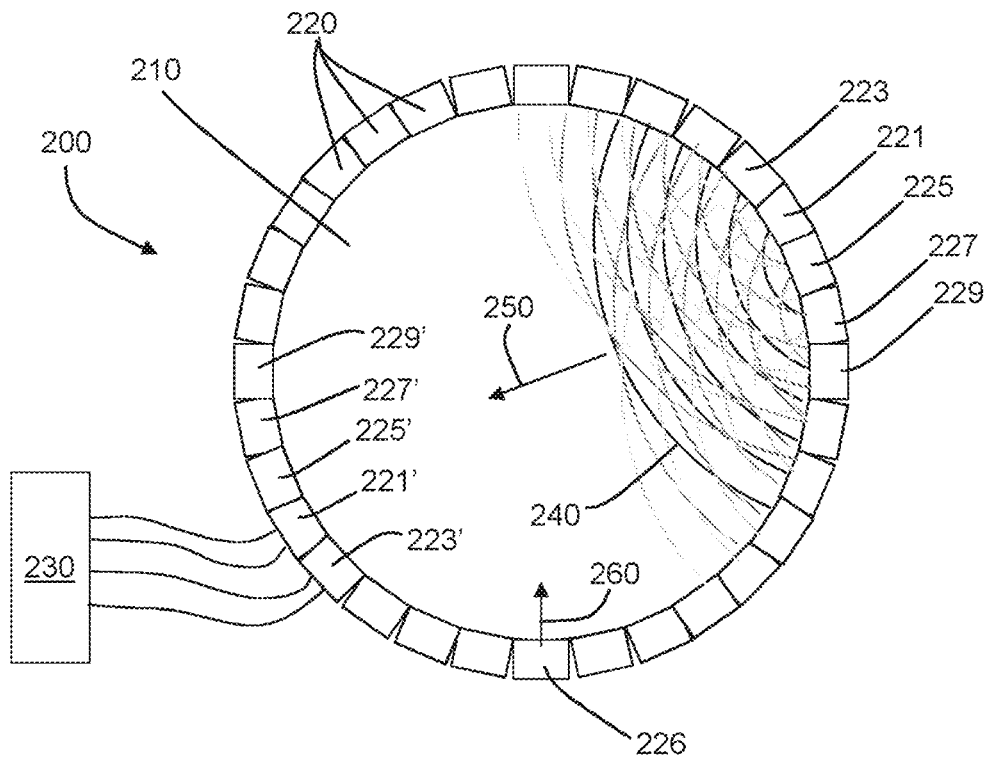
FIG. 2 is a schematic diagram showing a cross-section of an acousto-optic device according to a first embodiment of the invention, taken perpendicularly to the optical axis of the device.

An acousto-optic device 200 according to a first embodiment of the invention is illustrated in FIG. 2. Device 200 comprises an optically transmissive element 210 in the form of a shallow cylinder of optical material. In the present embodiment the radius of the cylinder is 20 mm, and the depth of the cylinder is 10 mm. As with the typical acousto-optic device 100 the optical material may be a glass, or a suitable crystalline material. A number of materials can be used, including for example those materials disclosed above with reference to typical acousto-optic device 100. Input and output faces for an optical beam are provided by the opposing parallel surfaces of the cylinder; the view of FIG. 2 shows a cross section taken perpendicularly to the axis of the cylinder. A ring of piezo-electric transducers 220 is provided around the curved surface of the cylinder. In device 200 thirty-two transducers are regularly spaced around the circumference of the cylinder, with no gap between adjacent transducers. Each transducer is operable to generate an acoustic wave in the element 210. For a single ring of transducers, each transducer will cover a fraction of the circumference, and substantially the whole depth of the shallow cylinder. One such transducer activated alone will generate an acoustic wave in the optical material having a roughly cylindrical wavefront. The transducers in combination generate an acoustic wave in the optical material that results from the superposition of the excitations generated by each individual transducer.

A controller 230 is connected to each of the transducers 220 (though connections are illustrated to only two of the transducers for clarity). Controller 230 is able to activate each of the transducers with a predetermined amplitude and phase or delay so as to control the form of the acoustic wave generated in the optical material. FIG. 2 schematically illustrates the wavefronts generated by activation of a number of the transducers. In combination the transducers are controlled to generate an approximate plane wave at the centre of the cylinder. An optical beam incident on the input face of the cylinder propagates through the element. The beam is arranged to be incident along the axis of the cylinder, which forms the optical axis of the device. It is thus incident perpendicularly on the input face of the optical element. In the present embodiment the beam has a diameter of approximately 5 mm, and it interacts with the acoustic wave in a zone around the centre of the cylinder. The beam is not incident at the Bragg angle to the input face of the device 200, and as a result the efficiency of the transfer of optical power from the undeflected beam to a deflected beam is not optimal. However, as explained further below, device 200 can function to deflect the optical beam in a wider range of directions than typical acousto-optic device 100.

Controller 230 is provided by a computer or microcomputer. Each transducer is connected to the controller 230 by a separate channel comprising a voltage controlled oscillator (VCO), a variable phase delay, and an amplifier. The controller is operable to output analog voltages to the VCOs so as to control the frequency of the acoustic wave. The variable phase delay determines a phase offset to apply to the signal, set by the controller. The amplifier subsequently amplifies this signal to the desired amplifier and passes the signal to the transducer to generate an acoustic excitation in the optical element. Alternatively a signal can be synthesised directly from a computer (direct digital synthesis), amplified and passed to the transducer.

By way of example, in operation, transducer 225 is activated by the controller 230. Individually transducer 225 would generate an acoustic wave having approximately cylindrical wavefronts 240. The two transducers immediately adjacent the transducer 225, and on both sides of transducer 225 (transducers 221, 223, 227, and 229, as illustrated) are also activated. Individually, these transducers would also generate acoustic waves having approximately cylindrical wavefronts, as is illustrated in FIG. 2 in paler line. The amplitude of transducers 221 and 227 is reduced in comparison to that of transducer 225; and that amplitude of transducers 223 and 229 is further reduced. Phase offsets are also introduced between the signals applied to transducers 221 and 227, and transducers 223 and 229, relative to transducer 225. The amplitudes and phase offsets are determined by controller 230 and are selected such that in combination, the transducers generate an approximately plane wavefront at the centre of the cylinder, with amplitude greatest near the centre of the cylindrical optical element. The plane wavefront propagates in the direction generally indicated by arrow 250.

Figure 3:
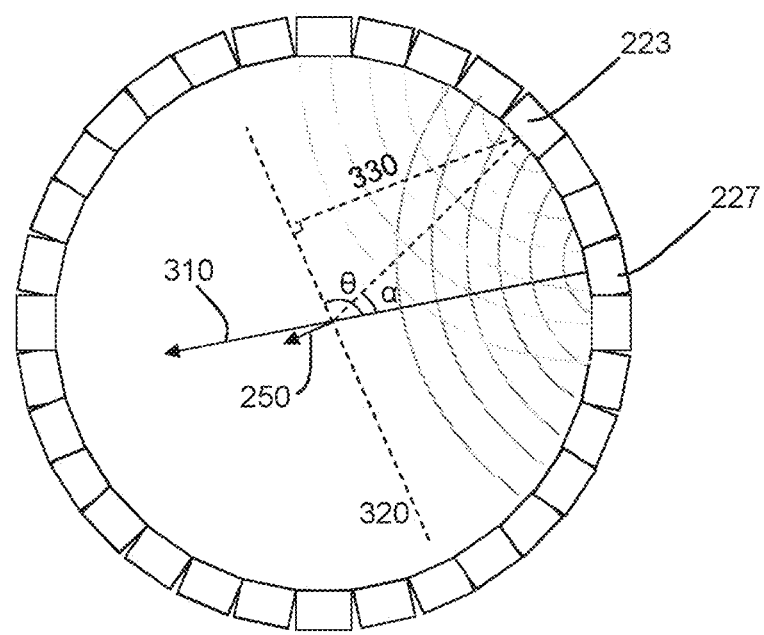
FIG. 3 also shows a cross-section of an acousto-optic device according to the first embodiment, taken perpendicularly to the optical axis of the device showing an arbitrary reference axis and items to determine a phase offset.

The phase offset for each transducer can be calculated for an arbitrary reference axis such as axis 310 illustrated in FIG. 3. In order to generate a plane wavefront 320 at an angle θ to the reference axis, a transducer n, such as transducer 223 in FIG. 3, that is located at angle $\alpha_n$ to the reference axis, is activated with a phase offset φ of:

$$\varphi = -2\pi(r\sin(\theta - \alpha_n)\bmod \Lambda)$$

where r is the radius of the cylinder. It will be noted that r sin(θ−α) is the shortest distance 330 between transducer 223 and dashed line 320 at which it is desired to form a wavefront. This provides a formula for the phase offset φ which must be applied to a transducer by the controller 230 in order to ensure that the excitations generated by each transducer interfere constructively at line 320 so as to create a plane wavefront. The amplitude plane wave generated should be at a maximum near the centre of the cylinder where the light beam passes through the device. A suitable amplitude profile is a $\cos^2$ profile with distance away from the centre of the cylinder as the wavefront passes through the centre of the cylinder. This is achieved using an excitation at each transducer of the form:

$$A_n = A\cos^2\left(\frac{r}{\pi}\cos(\theta - \alpha_n)\right)$$

where $A_n$ is the amplitude of the excitation generated at transducer n, A is the amplitude desired at the centre of the cylinder, and the other terms are defined above.

Device 200 enables the direction of deflection of an input optical beam to be altered by changing which of the transducers 220 is activated. As described above, activation of transducer 225 and adjacent transducers generates an approximately plane wave propagating in the direction of arrow 250. An optical beam propagating through this wave will be deflected in the direction of arrow 250. By selecting a different set of transducers in place of transducer 225, 221, 223, 227, 229, a different direction of deflection is achieved. For example, selection of transducer 226, at the bottom of the ring as illustrated, as the central transducer activated, and activating adjacent transducers as described above, will result in an acoustic wave propagating upwards through the optical material in the direction of arrow 260, and therefore a deflection of an input optical beam in the upward direction. A deflection in any direction can be achieved by appropriate selection of transducers. The controller 230 can therefore determine the direction of deflection of an incident optical beam by selecting which set of transducers to activate and controlling the amplitude and phase of their excitation accordingly. As for example can be seen from the expression for φ above, an arbitrary reference axis can be selected and phase offsets determined relative to that axis. It is not therefore necessary for the reference axis to pass through a central transducer, but it is instead anticipated that directional control with a precision of around two degrees will be possible using device 200, by selecting which transducers are activated and applying appropriate phase offsets.

The acoustic wave generated by the transducers propagates across the element 210. It may be reflected from the opposing part of the surface of the element to subsequently cause acoustic interference within the element. Such interference can limit the degree to which an approximate plane wave can be formed at the centre of the element. Interference from multiple reflections can also be difficult to model and so renders it difficult to calculate appropriate amplitudes and phase offsets for the activation of the transducers. In order to mitigate the effects of such reflections one or more transducers opposite the central transducer can be activated to cancel the acoustic wave when it reaches the opposing edge. Thus, for example, if transducer 225 is activated as the central transducer, transducer 225', and transducers 221', 223', 227', and 229' adjacent transducer 225' can be activated to cancel the acoustic wave before it reaches the opposing surface and reflects. Transducers 225' and those adjacent it will be activated at a delay after transducer 225 is activated, the delay being approximately the length of time for the acoustic wave to traverse the optical material; and at a reduced amplitude, so as not to cancel the acoustic wave throughout the optical material but only in the region near the opposing portion of the optical material surface. The phase of activation of transducers 221', 223', 225', 227', and 229' is selected to be in antiphase with the acoustic wave generated by transducers 221, 223, 225, 227, and 229.

The actual form of an acoustic waveform generated in the element 210 by a particular activation of the transducers can be fully determined by simulation and modelling. Several simulation tools are available to enable such determination. For example, simulation can be performed using MATLAB®, or using specific tools designed for analysis of wave propagation (for example, tools used primarily for electromagnetic modelling such as CST Studio Suite®). Subsequent testing and calibration of the device itself can be used to ensure that the desired deflection is achieved in practice. For example the device can be arranged to output the optical beams to a camera, and the deflection caused by a particular set of transducer excitations measured. The results can be used both to confirm the deflection created by a particular set of transducer excitations, and to calibrate the device. A limiting factor on the precision of the device may result from difficulty in suitably accurate positioning of the transducers around the cylinder during manufacture. Errors arising from lack of positioning precision can be mitigated using such calibration.

Figure 4:
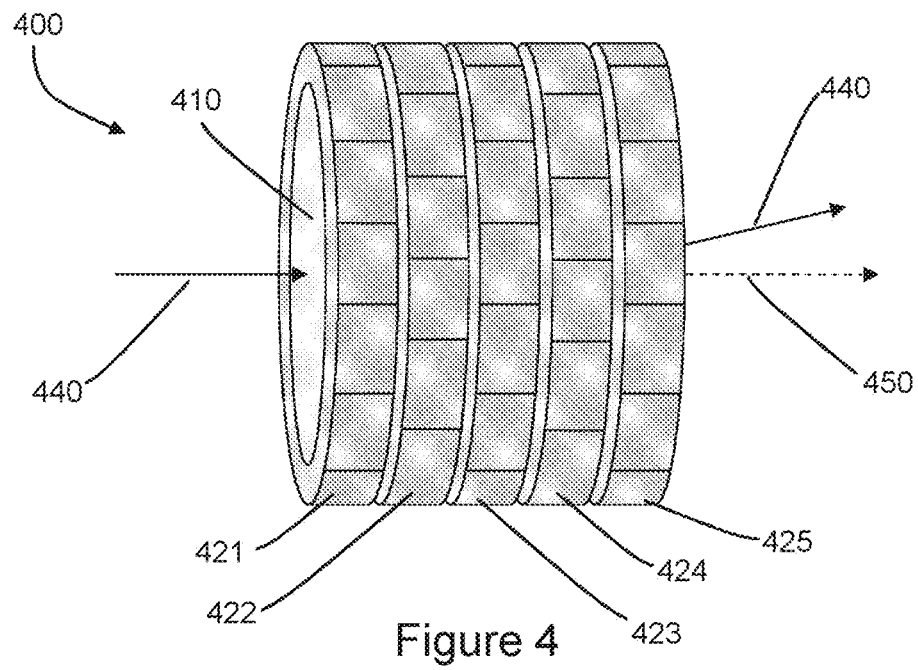
FIG. 4 is a schematic perspective diagram showing an acousto-optic device according to a second embodiment of the invention.
Figure 5:
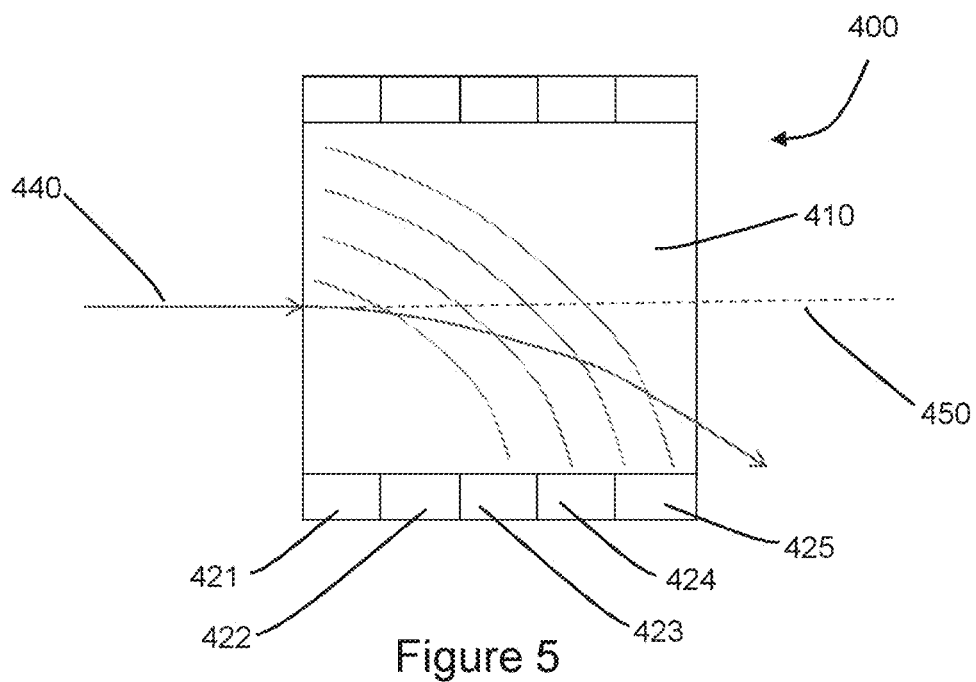
FIG. 5 is a schematic diagram showing a cross-section of an acousto-optic device according to a second embodiment of the invention, taken parallel to the optical axis of the device.

A device 400 according to a second embodiment of the invention is illustrated in FIGS. 4 and 5. Similar to device 200, device 400 comprises an optical element 410 in the form of a cylinder of optical material, such as a glass, having transducers arranged around the curved surface of the cylinder. The parallel faces of the cylindrical element 410 provide input and output surfaces for an optical beam. In contrast to device 200, the transducers are arranged in multiple rings around the cylinder 410. Five rings of transducers 421, 422, 423, 424, 425, are provided in the case of device 400. Each ring has a depth of 5 mm, and the cylinder has a total depth of 25 mm.

As with device 200, in operation of device 400 an optical beam 440 is incident normally on the axis of the cylindrical optical element 410, which defines an optical axis for device 400. In use the beam is split by the device into a deflected output beam (also labelled 440) and an undeflected beam, indicated by dashed line 450. Since a number of rings of transducers are provided, it is possible to create an acoustic wave having a wavefront that is curved with respect to the cylinder axis. The degree to which the wavefront is curved is determined by the relative phases and delays applied to the transducers in each of the rings 421, 422, 423, 424, and 425. In this way, although the input beam is incident normally on the surface of the cylinder the angle of the acoustic wavefront can be altered by control of the excitations generated by the different rings of transducers. In this way the input optical beam can be arranged to be at or near the Bragg angle to the acoustic wavefront, regardless of the direction in which deflection is desired, by changing the excitations of the transducers rather than by changing the direction in which the input beam is incident on the optical element. This enhances the deflection achieved by device 400 in comparison to device 200, in the sense that a greater efficiency of transfer of optical power to the deflected beam is possible because the input beam is closer to the Bragg angle to the acoustic wave.

As described above with respect to device 200, an acoustic waveform is generated at the centre of the cylinder 410 by the activation of multiple transducers. Away from the central region the acoustic waveform may suffer from distortion due to edge effects or due to proximity to the multiple transducers used. There may be a limited volume in which the form of the wavefront is optimal for producing deflection of the input optical beam. Additionally or alternatively to the generation of a curved wavefront as described above, the use of multiple separately-controllable rings of transducers enables the position of that volume to be moved to align with the expected path of the optical beam through the optical material.

Figure 6:
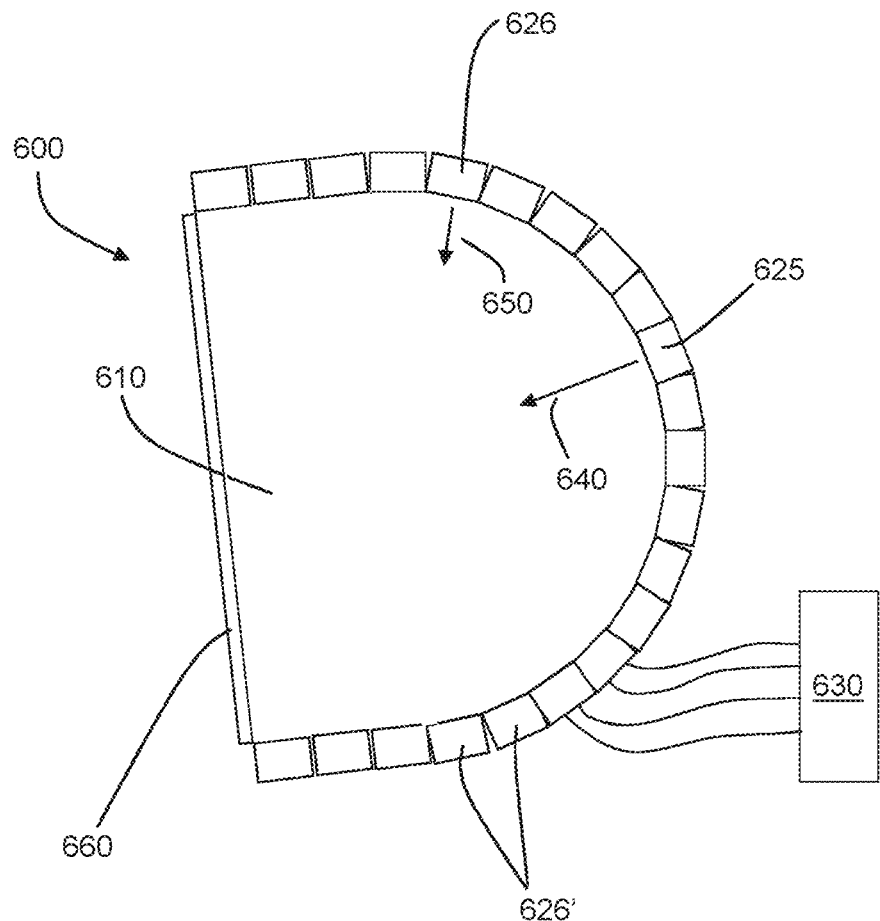
FIG. 6 is a schematic diagram showing a cross-section of an acousto-optic device according to a third embodiment of the invention, taken perpendicular to the optical axis of the device.

An acousto-optic device 600 according to a third embodiment of the invention is schematically illustrated in cross section in FIG. 6. Device 600 operates in a similar way to device 200 described above, but the transmissive optical element 610 has a different shape. Instead of having a circular cross-section the element 610 has a D-shaped cross section. The cross-section thus has a curved, semi-circular portion with edges that extend approximately parallel to each other to provide a rectangular portion of the cross section, as shown in FIG. 6. In use, a beam of light is received from a direction perpendicular to the plane of FIG. 6, this direction defining an optical axis for device 600.

Transducers (such as transducers 625, 626, and 626') are provided around the curved surface of the element, and along the parallel edges. The transducers can be activated to generate acoustic waves in the element. A controller 630 is used to control the amplitude and phase of the excitations generated by the transducers. For example, transducer 625 can be selected as a central transducer and activated with adjacent transducers to generate a plane acoustic wave propagating through the optical material in the direction generally indicated by arrow 640. The controller 630 determines the phase offset between the activated transducers, and their relative amplitudes. This will result in the deflection of an optical beam in the direction generally indicated by arrow 640. An absorber layer 660 is provided on the surface opposing the transducers so as to absorb the acoustic wave and mitigate any possible reflections at the surface of the element 610.

Directional control of the deflection created by the device 600 is obtained, as with device 200, by selecting a different transducer, such as transducer 626, as the central transducer. Selection of transducer 626 as the central transducer, and activating adjacent transducers with an appropriate phase offset and amplitude, can result in the generation of a generally plane acoustic wave propagating in the direction of arrow 650, and correspondingly a deflection of an optical beam in the same direction. In this case it may be necessary to activate transducers 626' to cancel any acoustic excitation at the portion of the curved surface of the element 610 generally opposing transducer 626. This is achieved by the selection of appropriate delay and amplitude by controller 630. Similarly to device 200 described above, it is possible to select a reference axis that does not pass through one of the transducers in order to obtain finer directional control. It will be understood that the range of directional control is reduced in comparison to device 200. However, within the reduced range, device 500 can provide a higher precision of directional control for a similar number of transducers, when compared to device 200.

Devices 200, 300, and 600 can be used in applications where two dimensional control of the deflection of an optical beam is needed, such as in LADAR systems. Most particularly the devices can be used where space and/or weight constraints are present, such that it is preferable to use a single device 200, 300, or 500 instead of a combination of typical acousto-optic devices that, individually, are only able to deflect light in one dimension. Such space and/or weight constraints are often found in aerospace applications, for example in guided missiles, and LADAR systems used in such aerospace applications will be required to fit within strict size, weight and power constraints. The reduction in size and weight achieved by using a single device capable of deflecting a beam in two separate dimensions, as opposed to using two devices operated in series, may therefore be of benefit in such applications.

Whilst a number of specific embodiments of the invention have been described above, those skilled in the art will appreciate that variations and modifications to those embodiments are possible. For example, the number of transducers used in the ring can be varied. In some cases a larger number of transducers may be desired in order to increase the directional resolution that can be achieved in controlling deflection of an optical beam. In other cases fewer transducers may be used if, for example, it is desired to reduce the cost of the device or if the size available for the device is significantly constrained. It is anticipated that between 10 and 100 transducers will be an appropriate number of transducers. The directional resolution of the device is expected to increase as more transducers are used. However, the size and weight of the device and its associated electronics will also increase, since, as described above, each transducer requires a separate electronics channel. In certain applications, such as aerospace applications, the disadvantages associated with increased size and weight may outweigh the benefits of increased directional resolution. Furthermore it will similarly be possible to vary the number of rings of transducers used in devices such as device 400. An increased number of rings will enable the curvature of the wavefront to be more finely controlled so that, for example, the Bragg condition can be more effectively met. It will be noted that, in devices with alternative geometries (such as device 500), it will also be possible to provide an arrangement of transducers with which profiling of the wavefront through the depth of the device is possible, with more than one transducer along the length of the device.

It will also be understood that, whilst in the above it has been described with respect to device 200 to activate five of the transducers in order to generate the acoustic wave, with a corresponding five used to cancel the acoustic wave at the opposite side of the optical element, the number of transducers used may vary from this. Improved control may be achieved by using a greater number of the transducers. For example, in device 200, to generate a deflection in the upward direction, all the transducers on the lower half of the device may be activated to generate an acoustic wave (each with appropriate amplitude, phase, and delay), and all the transducers on the upper half of the device used to cancel the acoustic wave before reflections are generated.

It will also be understood that, whilst the transducers may be closely adjacent on the surface of the transmissive optical element, they may also be spaced apart. Should the transducers be spaced apart the gaps between the transducers may be filled with an acoustically absorbing material.

It will also be appreciated that, whilst a small number of geometries for the acousto-optic device have been described above, many others will be possible. Elliptical cross-sections may for example be useful, or, similar to device 500, other cross-sections in which only a part of the edge of the optical material is curved. If will be understood that any imperfections in the geometry of the optical material can be adjusted for by calibration of the controller. It will be appreciated that the device may be configured, by appropriate control of the transducers, such that the optical beam need not pass through the centre of the optical material, but at an offset therefrom. The phase offsets and amplitudes at which the transducers are activated can be controlled such that a plane wave is produced at a predetermined point in the optical material. It will also be understood that the phase offsets, amplitudes and delays at which the transducers are activated can also be adjusted in the event that the optical material is acoustically anisotropic.

Finally, it should be clearly understood that any feature described above in relation to any one embodiment may be used alone, or in combination with other features described, and may also be used in combination with one or more features of any other of the embodiments, or any combination of any other of the embodiments.

The invention claimed is:

1. An acousto-optic device operable to deflect a beam of light, the acousto-optic device comprising:
an optically transmissive element to receive the beam of light at an input surface, the beam of light being received from a direction defining an optical axis;
a set of acoustic transducers spaced around the optically transmissive element; and
a controller operable to activate the acoustic transducers to generate an acoustic wave travelling through the acousto-optic device to intersect with the optical axis; the controller being further operable to selectively activate a first subset of the set of acoustic transducers such that the acoustic wave propagates in a selected direction; and wherein each of the set of acoustic transducers is differently orientated such that the selected direction is controllable through the selection of first subset of acoustic transducers from the set of acoustic transducers, the acousto-optic device thereby being operable to control the direction in which the beam of light is deflected in two dimensions,
wherein the controller is further operable to activate a second subset of the set of acoustic transducers, at a delay after the first subset of the set of acoustic transducers is activated, the delay, amplitude, and relative phase at which the second subset of the acoustic transducers is activated being selected so as to at least partially cancel the acoustic wave after it has intersected with the optical axis.

2. An acousto-optic device as claimed in claim 1 wherein the controller is operable to control the frequency, relative phase, and amplitude at which the first subset of acoustic transducers are activated such that the generated acoustic wave exhibits a generally planar wavefront where it intersects with the optical axis.

3. An acousto-optic device as claimed in claim 1, comprising a plurality of sets of acoustic transducers spaced around the optically transmissive elements, each of the plurality of sets of acoustic transducers being spaced apart along the optical axis of the optically transmissive element.

4. An acousto-optic device as claimed in claim 3 wherein the controller is operable to activate the plurality of sets of acoustic transducers to maintain a target angle at which the beam intersects an acoustic wavefront as the beam propagates through the optically transmissive element.

5. An acousto-optic device as claimed in claim 4 wherein the target angle is the Bragg angle.

6. An acousto-optic device as claimed in claim 1 wherein the optically transmissive element has a surface that is at least partly curved.

7. An acousto-optic device as claimed in claim 1 wherein the optically transmissive element is generally cylindrical.

8. An acousto-optic device as claimed in claim 1 wherein the set of acoustic transducers are distributed around a loop on the optically transmissive element.

9. An acousto-optic device as claimed in claim 1 wherein the beam of light is received normally to the input surface of the optically transmissive element.

10. An acousto-optic device as claimed in claim 1 wherein the optically transmissive element is formed of a glass.

11. An acousto-optic device as claimed in claim 1 wherein the optically transmissive element is formed of a crystal.

12. An acousto-optic device as claimed in claim 1 wherein the set of acoustic transducers comprises at least 5 acoustic transducers.

13. An acousto-optic device as claimed in claim 1 wherein the set of acoustic transducers comprises at least 10 acoustic transducers.

14. An acousto-optic device as claimed in claim 1 wherein the set of acoustic transducers comprises less than 100 acoustic transducers.

15. A LADAR system comprising an acousto-optic device as claimed in claim 1.

16. A guided missile comprising the LADAR system as claimed in claim 15.

17. A method of operating an acousto-optic device to deflect a beam of light, the acousto-optic device comprising: an optically transmissive element having an input surface; a set of acoustic transducers spaced around the optically transmissive element, each of the set of acoustic transducers being differently orientated; the method comprising the steps of:

a) receiving the beam of light at the input surface from a direction defining an optical axis;

b) selectively activating a first subset of the set of acoustic transducers to generate an acoustic wave travelling through the acousto-optic device in a selected direction to intersect with the optical axis; the selected direction being controllable through the selection of first subset of acoustic transducers from the set of acoustic transducers; and c) activating a second subset of the set of acoustic transducers, at a delay after the first subset of the set of acoustic transducers is activated, and selecting the delay, amplitude, and relative phase at which the second subset of the acoustic transducers is activated so as to at least partially cancel the acoustic wave after it has intersected with the optical axis.

18. A method as claimed in claim 17, wherein the step of selectively activating a first subset of the set of acoustic transducers comprises controlling the frequency, relative phase, and amplitude at which the first subset of acoustic transducers are activated such that the generated acoustic wave exhibits a generally planar wavefront where it intersects with the optical axis.

19. A method as claimed in claim 17 wherein the beam of light is received normally to the input surface of the optically transmissive element.

\* \* \* \* \*